United States Patent

[11] 3,616,339

[72] Inventor William Frank Marzluff
2211 Verde Oak Drive, Stamford, Conn.
[21] Appl. No. 871,727
[22] Filed Oct. 17, 1969
[45] Patented Oct. 26, 1971
[73] Assignee American Cyanamid Company
Stamford, Conn.
Continuation of application Ser. No. 582,238, Sept. 27, 1966, now abandoned.

[54] PROCESS FOR PURIFYING AIR
14 Claims, 3 Drawing Figs.
[52] U.S. Cl. .................................................. 204/130, 204/1 R, 204/131
[51] Int. Cl. .................................................... B01d 57/00, B01k 1/00
[50] Field of Search ...................................... 204/129–130, 131, 1 R; 136/86

[56] References Cited
UNITED STATES PATENTS

| | | | |
|---|---|---|---|
| 3,401,100 | 9/1968 | Macklin ....................... | 204/129 |
| 996,705 | 7/1911 | Cross............................ | 204/129 |
| 2,390,591 | 12/1945 | Janes............................ | 204/129 |
| 2,681,887 | 6/1954 | Butler, Jr...................... | 204/129 |
| 3,124,520 | 3/1964 | Juda.............................. | 204/86 |
| 3,017,338 | 1/1962 | Butler et al. .................. | 204/98 |

FOREIGN PATENTS

| | | | |
|---|---|---|---|
| 1,039,411 | 8/1966 | Great Britain................ | |
| 1,039,412 | 8/1966 | Great Britain................ | |
| 1,386,878 | 12/1964 | France ......................... | 204/129 |

Primary Examiner—John H. Mack
Assistant Examiner—R. L. Andrews
Attorney—Gordon L. Hart ABSTRACT: Oxidizable gas impurities in air are removed at the anode of a powered electrochemical cell which comprises an air cathode, a matrix electrolyte and an anode having a surface of lead dioxide or other metal or metal oxide in direct contact with the impinging impure air and in electrical contact with the electrolyte.

INVENTOR.
WILLIAM FRANK MARZLUFF
BY Harry H. Kline
ATTORNEY

PATENTED OCT 26 1971
3,616,339
SHEET 2 OF 2
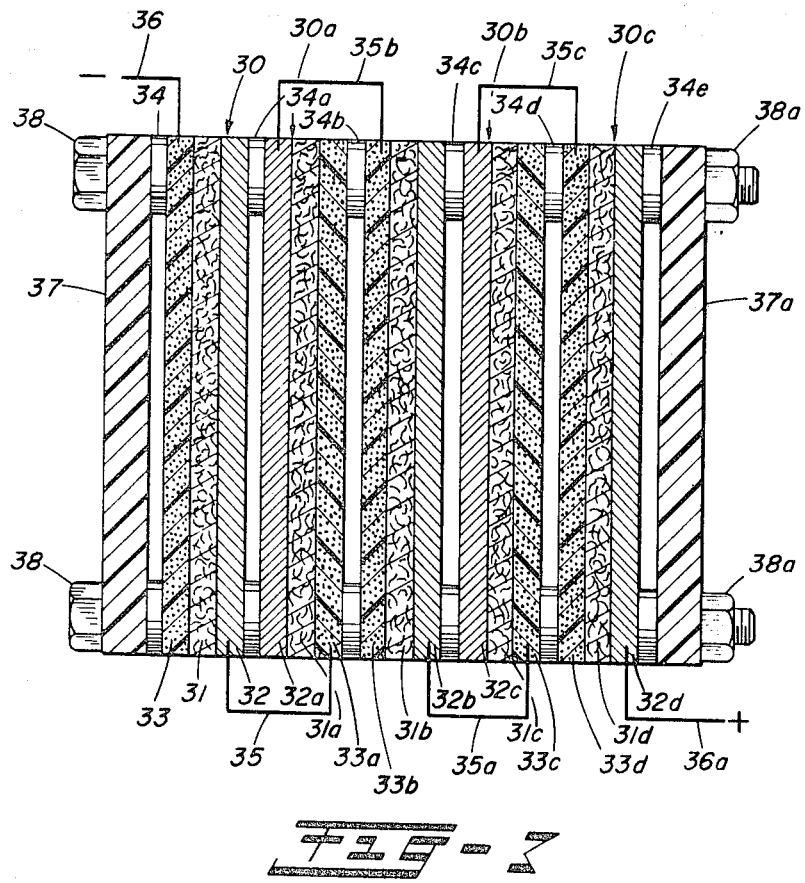
INVENTOR.
WILLIAM FRANK MARZLUFF
BY
ATTORNEY

PROCESS FOR PURIFYING AIR

This application is a continuation of our copending application Ser. No. 582,328, filed Sept. 27, 1966.

The present invention relates to a novel process for the purification of air and to a novel electrolytic cell for removing gaseous contaminants which may be present in air. More particularly, the invention relates to a process for removing and converting to innocuous products, dissolved and suspended contaminants in air using a novel electrolytic cell, which comprises in sandwich fashion a positive electrode, a negative air electrode and an acid matrix positioned therebetween.

It is well known that the air in occupied spaces, such as in homes, offices, schools, buses, automobiles, as well as "fresh" outdoor air in many urban and rural localities, contains contaminants. Generally, the latter are dissolved or suspended impurities derived from both natural and man made origins. Thus, odorous molecules of principally organic materials originate from cooking, smoking, industrial processes, heating and power generators, transportation vehicles and from human and animal sources. Such contaminants are at best esthetically unpleasant, and in many cases have been shown to produce a deleterious effect on the health and well-being of people exposed to them. Further, these contaminants tend to injure crops, textiles, rubber and other articles of economic value.

In the past, a good deal of effort, time and treasure has been expended in attempts to purify air in confined spaces. Unfortunately, the techniques developed have not been wholly satisfactory. For instance, in one procedure, an aqueous potassium permanganate spray is employed to purify air. In another procedure, a stream of impure air is passed through activated charcoal. In a third procedure, impure air is passed through a bed of absorbent solids, such as alumina or silica gel impregnated with an alkali metal permanganate. All of the aforementioned techniques suffer from certain limitations of effectiveness or utility. For instance, when utilizing either an aqueous solution of a permanganate or a permanganate absorbed in the pores or on the surface of an activated absorbent material, the permanganate oxidizing material must be continuously or frequently replaced because it is consumed in the process. In the case of activated carbon, desorption of odoriferous materials from charcoal due to climatic changes involving temperature and relative humidity variations can and does occur in use. Consequently, if a procedure or apparatus for purifying contaminated air could be provided which is both economical and efficient regardless of temperature and humidity variations, such a procedure and apparatus would fulfill a longfelt need.

It is, therefore, a principal object of the invention to provide an efficient electrochemical method for purifying air. It is a further object of the invention to provide a novel electrolytic cell which is capable of removing and electrochemically converting unwholesome contaminants in air to an innocuous form. Other objects and advantages will become apparent from a consideration of the ensuing description.

To this end, there is provided a procedure utilizing a novel direct current powered electrolytic cell which unexpectedly removes contaminants from air in an economical and efficient manner. In brief, the powered cell comprises a negative air electrode, a positive metal or metal oxide electrode and an acid electrolyte matrix positioned between the two electrodes. Air which contacts this cell is substantially completely purified.

According to the process of the invention, stale or contaminated air is contacted with an electrolytic cell or through a plurality of such cells electrically connected in series. In general, the electrolytic cell comprises a sandwich of: (a) a positive, porous metal or metal oxide electrode, (b) a matrix pad abutting the positive electrode and comprising an electrolyte impregnated substrate, (c) a negative air electrode abutting the matrix pad and comprising a porous sheet comprising porous carbon or graphite or a metal or metal oxide, capable of electrolytically reducing oxygen, and (d) means for electrically connecting the cell to a direct current power source and is placed in intimate contact with contaminated air. Any oxidizable substance present in the air is found to be substantially absorbed and subsequently oxidized to innocuous products, whereby the resultant treated air is deemed to be purified.

Illustrative of materials suitable for use as the positive electrode include, for instance, porous lead dioxide, a perforated lead sheet upon which a layer of lead dioxide is deposited, a lead dioxide layer intimately contacting a perforated sheet comprising a mixture of lead and bismuth or antimony, a screen fabricated from lead dioxide, platinum black on a tantalum screen or manganese dioxide on a tantalum screen.

The matrix pad material in the cell herein employed may be fabricated from a substrate of ordinary filter paper, glass fiber paper, asbestos mat or polymeric ion exchange materials. Each of the latter substrates is impregnated with a nonoxidizable inorganic acid, such as sulfuric acid.

As the negative air electrode, there may be employed a noble metal, such as palladium, rhodium or platinum, porous carbon or graphite, a graphitized noble metal, or porous graphitized plastic matrix of polyethylene or polytetrafluoroethylene. It is a good practice to employ polytetrafluoroethylene as a binder when adding the latter to carbon to insure that an electrode is formed substantially stronger than carbon per se. One such method involves, for instance, the heating of 95 parts of polymethylmethacrylate to mill the latter to the molten viscous state on a rubber mill maintained at a temperature between 170° C. and 175° C. To the latter is added 5 parts of polytetrafluoroethylene as a 60 percent aqueous emulsion and 20 parts of graphite which is obtained as a byproduct in the manufacture of calcium cyanamide. The graphite is blended into the molten methylmethacrylate. On cooling, the mixture is ground into pellets and injection molded to form a plaque. This plaque is compression molded at temperatures between 180° C. and 200° C. and at a pressure of about 1,000 p.s.i. to form a sheet approximately 30 mils in thickness and 6 inches square. This sheet is immersed in acetone for approximately 16 hours at 25° C. to extract polymethylmethacrylate therefrom. Finally, the sheet is washed with acetone for from 1 to 2 hours in two subsequent washings, and discs of desired form are cut from the so-prepared electrode sheets. The latter is exemplary of an air electrode which is directly linked to the negative terminal of a power source.

Illustrative impurities or contaminants which are found in air and which can be removed by the process of the present invention are, for instance, various amines, esters, mercaptans, sulfides, aldehydes, ketones, alcohols, organic acids, aromatic and unsaturated hydrocarbons, odors from stale cigars, cigarettes and pipes, oxides of sulfur, cooking odors, and metabolic odors. Conversion to nonodoriferous substances upon contact of the oxidizable contaminants in air is substantially instantaneous when utilizing metal or metal oxide positive electrodes.

In the operation of the cell, it has been found that from 0.01 to 100 milliamperes per square centimeter of electrode surface are suitable. However, for most purposes, a range between about 0.1 and 50 milliamperes per square centimeter of electrode surface is sufficient for optimum operation.

To further clarify the invention, there are shown in the accompanying drawings certain embodiments thereof which will be described in detail.

In the drawings:

FIG. 3 is a partially expanded side view, partially in section, of a plurality of electrolytic cells.

Figure 1:
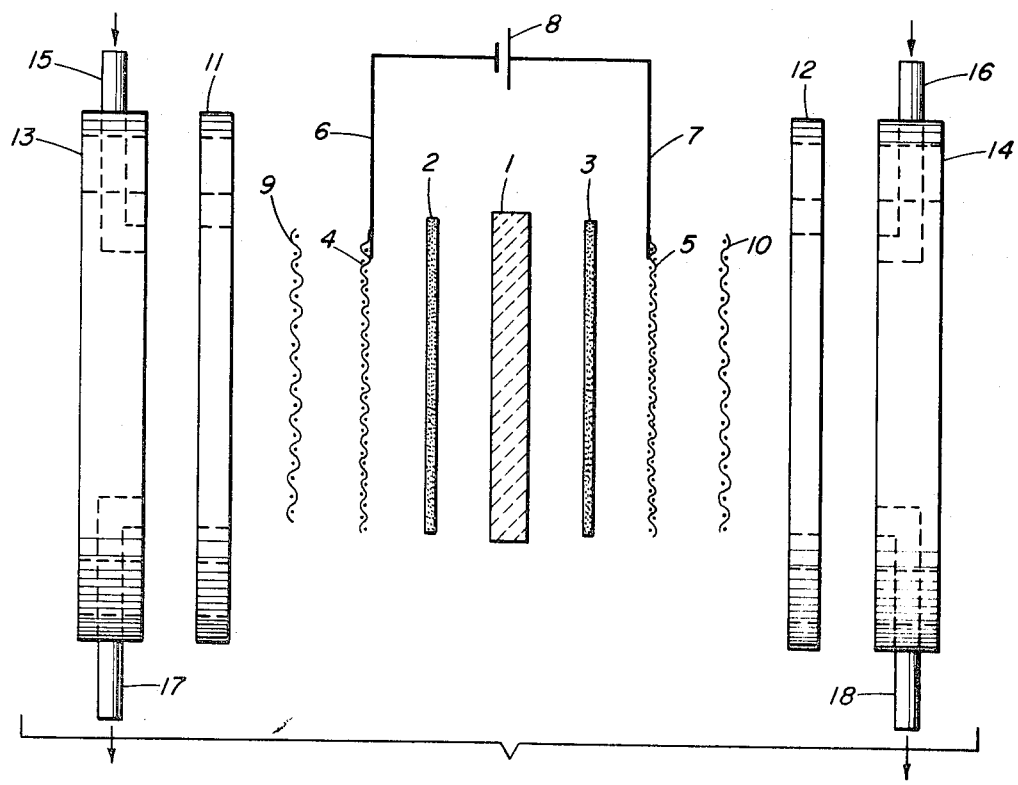
FIG. 1 is an exploded view, partially in section, of an electrolytic cell.
Figure 2:
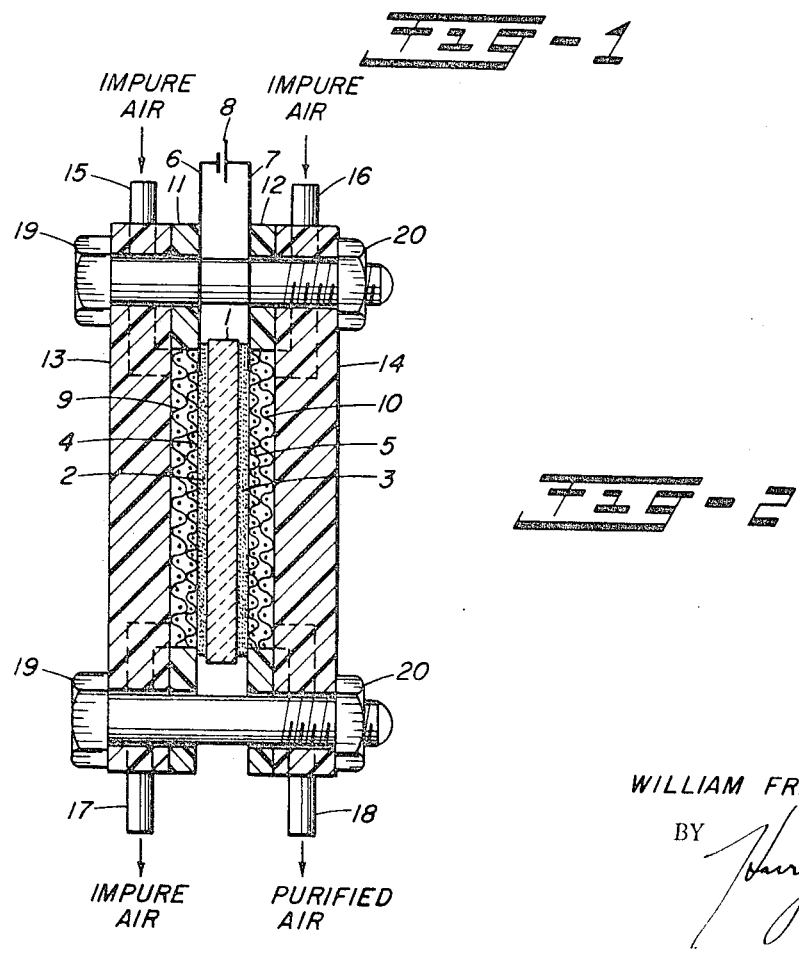
FIG. 2 is a partially expanded side view, partially in section, of the electrolytic cell of FIG. 1.

In FIG. 1, a filter paper membrane 1 impregnated with sulfuric acid is positioned between an air electrode 2 and a positive electrode 3. Abutting the latter electrodes are metallic screens 4 and 5, respectively, each of which can be fabricated from platinum, stainless steel, gold plated nickel or other suitable inert metal. Polyethylene mesh spacers 9 and 10 are employed to compress the metallic screens 4 and 5 to which wire leads 6 and 7 are attached. These wire leads are also attached to a direct current power source 8. The plastic mesh spacers 9 and 10 are positioned exteriorly to the current screens 4 and 5. External to the plastic mesh spacers are gaskets 11 and 12 fabricated from any suitable material, such as polytetrafluoroethylene or silicone rubber. Exterior to the gaskets 11 and 12 are end plates or housing members 13 and 14. In the latter end plates 13 and 14 are positioned an inlet metal tubing 15 and 16 through which impure air is introduced under a positive pressure and vented through stainless steel tubing 17 and 18. The electrical leads 6 and 7 which are connected to current screens 4 and 5 are secured by spot welding or suitable soldering so that these conductive members permit current from an exterior source to flow therethrough. Finally, the cell is secured by means of bolts 19 and nuts 20 as shown in FIG. 2.

In FIG. 3, a plurality of cells is shown at 30, 30a, 30b, 30c and 30d. The cell consists of a glass fiber membrane 31, 31a, 31b, 31c and 31d impregnated with 5N sulfuric acid positioned between a positive electrode 32, 32a, 32b, 32c and 32d and a graphite air electrode 33, 33a, 33b, 33c and 33d. The cells are separated by means of polyethylene spacers 34, 34a, 34b, 34c and 34d. Each cell is then electrically connected through wire leads 35, 35a, 35b and 35c which connect in series the positive electrodes to the negative air electrodes of each cell. Wire leads 36 and 36a emanating from the terminal cell electrodes are connected to a power source (not shown). End plates 37 and 37a secure the plurality of cells by bolts 38 and nuts 38a.

The positive electrode is positioned so as to face the positive electrode of the adjoining cell. Normally, the spacings between the adjacent positive electrodes are substantially larger than the spacings between the adjacent negative electrodes for the reason that less air is required to carry out the electrolysis involving the negative air electrode and more air to be purified can be advantageously passed through the spacing and over each of the positive electrodes.

Performance of the electrolytic cells when utilized in purifying contaminated air is set forth in the following examples which are merely illustrative and are not to be deemed as limitative of the invention. Unless otherwise stated, the parts given are by weight.

EXAMPLES -10

Air which is initially adjusted to and analyzing as containing 30 percent relative humidity and 20 parts per million (by volume) of a contaminant is passed over a 5 square centimeter positive and negative electrode surface of a cell as described in FIG. 2 at a rate of 100 cc./minute. The concentration of the contaminant remaining in the air after a single pass is measured by conducting the treated air emanating directly from the outlet port of the cell through a suitable gas liquid chromatograph analyzer. The concentration of the contaminant in the outlet stream on the positive electrode side is substantially reduced, whereas the contaminated air on the negative electrode side remains uneffected.

The conditions for conducting the air purification and the results are set forth in table I below.

EXAMPLE 11

Example 1 is repeated in every material detail except that air containing stale cigarette odors prepared by utilizing an artificial cigarette smoking machine is passed through the cell. Over a 90 hour period, several subjects are exposed to the issuing air. The odor level of the contaminated air is substantially reduced by one pass through the cell.

EXAMPLE 12

A cell assembly as shown in FIG. 3 of the drawings containing lead dioxide electrode, 4N sulfuric acid impregnated fiberglass pad and graphitized polytetrafluoroethylene air electrode is inserted into an air return duct of a central conditioning system. The air duct measures 10×10 inches and the assembly inserted therein measures g×9 by 12 inches in depth. Direct current is supplied to the assembly to provide about 10 watts per square foot of overall lead dioxide electrode surface area.

A 12×12 foot room is contaminated with cigarette smoke. The impurity level of the air is maintained for 2 hours. The air is circulated at a rate of 100 cu. ft./min. and within one hour, the odor is markedly reduced to an acceptable level.

Advantageously, the method of this invention is not limited to the purification of residences, offices, schools, hospitals and transportation vehicles, but can be applied to the treatment of any air volume for which purification is desired, such as the air found in spaces in which foods are stored, as well as in electronic cabinets.

In the foregoing specification, the terms "positive electrode" and "negative electrode" mean an anode and a cathode, respectively. These terms are well known and well defined in the electrochemical art.

I claim:

1. A process for purification of impure air which comprises bringing air which contains oxidizable gas contaminants into contact with a metal or metal oxide electrode surface at the positive electrode of an electrolytic cell which also comprises a negative electrode and electrolyte contacting both said electrodes, and supplying electric current to said cell sufficient to cause oxidation of gas contaminants from air at said metal or metal oxide surface.

2. A process defined by claim 1 wherein said metal or metal oxide electrode surface is lead dioxide.

3. A process defined by claim 1 wherein said metal or metal oxide surface is manganese dioxide.

4. A process defined by claim 1 wherein said electrode surface is lead dioxide on a conductive substrate and said electrolyte is sulfuric acid.

5. A process defined by claim 1 wherein said positive electrode comprises a lead plate with a surface coat of lead dioxide and said electrolyte is sulfuric acid.

6. A process for purifying air which comprises bringing air which contains oxidizable gas contaminants into contact with a metal or metal oxide electrode surface at the positive electrode of an electrolytic cell and bringing oxidizing air in contact with the negative air electrode of said cell which has an

TABLE I

| Example | Contaminant | Positive electrode | Electrolyte pad | Negative air electrode | Current density, ma./cm.[*] | Contaminant, percent removal |
|---|---|---|---|---|---|---|
| 1 | A-Pinene | Lead dioxide on perforated sheet of lead plus 3% bismuth. | Glass fiber (GF) paper impregnated with 2 M H₂SO₄. | Porous graphitized polytetrafluoroethylene. | 2 | 80 |
| 2 | Methylethyl ketone | Platinum black on tantalum screen containing 9 mg. Pt/cm.² | G.F. paper plus 4 M H₂SO₄. | Pt screen (40 mesh) | 10 | 60 |
| 3 | Butanol | do | Filter paper plus 4 M H₂SO₄. | Rh screen (40 mesh) | 50 | 85 |
| 4 | Toluene | Lead dioxide on perforated sheet of lead plus 6% antimony. | Ion exchange membrane plus 4 M H₂SO₄. | Platinized graphite polyethylene membrane. | 1 | 50 |
| 5 | Dibutylsulfide | Lead dioxide on lead screen | G.F. paper plus 6 M H₂SO₄ | do | 5 | 95 |
| 6 | Heptyl mercaptan | Lead dioxide on lead perforated sheet having an average of 1 mm. diameter, 5 mm. apart. | do | do | 5 | 95 |
| 7 | Butyraldehyde | Compressed lead dioxide powder. | G.F. apper plus 0.5 M H₂SO₄. | Porous graphitized polytetrafluoroethylene. | 10 | 95 |
| 8 | Acetic acid | Lead dioxide on perforated lead sheet. | G.F. paper plus 4 M H₂SO₄ | do | 5 | >95 |
| 9 | Valeraldehyde | do | do | do | 1 | >95 |
| 10 | Butanol | Manganese dioxide-graphite on tantalum screen. | do | do | 10 | 40 |

*Milliamperes per square centimeter.

electrolyte contacting said positive and negative electrodes, and supplying electric current to said device, whereby purification of air is attained.

7. A process according to claim 6 wherein said oxidizable gas contaminants comprise ketone contaminants.

8. A process according to claim 6 wherein said oxidizing gas contaminants comprise ester contaminants.

9. A process according to claim 6 wherein said oxidizing gas contaminants comprise tobacco smoke contaminants.

10. A process according to claim 6 wherein said oxidizing gas contaminants comprise aldehyde contaminants.

11. A process defined by claim 6 wherein said metal or metal oxide electrode surface is lead dioxide.

12. A process defined by claim 6 wherein said metal or metal oxide surface is manganese dioxide.

13. A process defined by claim 6 wherein said surface is lead dioxide on a conductive substrate and said electrolyte is sulfuric acid.

14. A process defined by claim 6 wherein said positive electrode comprises a lead plate with a surface coat of lead dioxide and said electrolyte is sulfuric acid.

* * * * *